(12) United States Patent
Li

(10) Patent No.: US 8,448,299 B1
(45) Date of Patent: May 28, 2013

(54) HANDLEBAR GRIP FOR A BICYCLE OR A MOTORCYCLE

(76) Inventor: Jin-Cang Li, Changhua County (TW)

( * ) Notice: Subject to any disclaimer, the term of this patent is extended or adjusted under 35 U.S.C. 154(b) by 6 days.

(21) Appl. No.: 13/335,971

(22) Filed: Dec. 23, 2011

(51) Int. Cl.
*B25G 1/10* (2006.01)

(52) U.S. Cl.
USPC .......... 16/421; 16/426; 16/431; 16/436; 74/551.1; 74/551.8; 74/551.9; 74/502.2

(58) Field of Classification Search
CPC ......... B60K 31/047; G05G 1/06; F02B 61/245
USPC ................ 16/421, 436; 74/489, 502.2, 551.9
See application file for complete search history.

(56) References Cited

U.S. PATENT DOCUMENTS

| 7,334,499 B2 * | 2/2008 | Lai | 74/551.9 |
| 7,866,002 B2 * | 1/2011 | Wang | 16/421 |
| 2007/0157758 A1 * | 7/2007 | Shih | 74/551.9 |
| 2008/0307923 A1 * | 12/2008 | Lai | 74/551.8 |
| 2009/0031847 A1 * | 2/2009 | Grimes | 74/551.9 |

\* cited by examiner

*Primary Examiner* — Tracie Y Green

(57) ABSTRACT

A handlebar grip for a bicycle or a motorcycle contains a sleeve member including a first segment, a second first segment, and a through hole, a holding face formed on the first segment, at least one limiting projection extending outward from the second segment, and a recessed pressing zone; a retaining housing including two hard engaging covers, at least one restricting groove to extend the limiting projection outward; a wall face formed around each of the at least one restricting groove and on each of the two engaging covers; the each of the two engaging covers including a C-shaped locking face; a locking device applied to lock the two engaging covers together so that the two engaging covers are locked on the handle outside the second segment by using two C-shaped locking faces respectively, and the two limiting projections of being axially limited by the two restricting grooves respectively.

19 Claims, 12 Drawing Sheets

HANDLEBAR GRIP FOR A BICYCLE OR A MOTORCYCLE

BACKGROUND OF THE INVENTION

1. Field of the Invention

The present invention relates to a handlebar grip for a bicycle or a motorcycle.

2. Description of the Prior Art

A conventional handlebar grip is integrally made of a soft plastic material and is fixed on a handle of a bicycle or a motorcycle in a retaining manner. But it can not be removed easily. Another conventional handlebar, disclosed in U.S. Pat. No. 6,263,759 and TW Pat. No. M282905, contains a preformed hollow housing made of a hard plastic material, a cover covered around the housing and made of a soft plastic material, and at least one metal loop; the metal loop is used to retain projections extending from at least one end of the housing of the handle.

However, the housing and the cover can not be replaced randomly based on requirement. Besides, the cover can not be replaced independently, and the housing has to be retained by using the metal loop.

To solve above-mentioned problems, an improved handlebar has been developed in US Publication No. 2010/0011905A1 and TW Pat. No. M348058, which contains at least one soft body, two hard housings, and at least two retaining bolts; the two housings are connected together to form an engaging member, and the retaining bolts are served to fix the body on the handle, a projecting portion of the body extends out of a hollow portion of the hard housings to form a comfortable holding surface.

Nevertheless, the housings cover the handlebar so only an extending segment of the projecting portion of the body is used to be the holding surface, accordingly a size of the housings is large to cause a higher production cost and a heavy weight. In addition, an area of the body grasped by a rider is limited.

The retaining bolts are served to fix the body on the handle, thus increasing assembly time.

The present invention has arisen to mitigate and/or obviate the afore-described disadvantages.

SUMMARY OF THE INVENTION

The primary object of the present invention is to provide a handlebar grip for a bicycle or a motorcycle is capable of overcoming the shortcomings of the conventional handlebar grip.

To obtain the above objectives, a handlebar grip for a bicycle or a motorcycle provided by the present invention contains:

a sleeve member including a first segment, a second first segment, and a through hole between the first segment and the second segment to insert a handle, a holding face formed on the first segment to be held a rider, at least one limiting projection extending outward from a palm side and a distal side of a finger section of the second segment respectively, and a recessed pressing zone around each of the at least one limiting projection;

a retaining housing including two hard engaging covers covered on the palm side and the distal side of the finger section of the second segment, at least one restricting groove to extend the at least one limiting projection outward; a wall face formed around each of the at leas one restricting groove and on an inner surface of each of the two engaging covers to cover and abut against the pressing zone; the each of the two engaging covers including a C-shaped locking face defined on an inner surface thereof to retain an outer surface of the handle extending into either of the first and the second segments of the sleeve member;

a locking device applied to lock the two engaging covers of the retaining housing together so that the two engaging covers are locked on the outer surface of the handle outside the second segment of the sleeve member by using two C-shaped locking faces respectively, and the two limiting projections of the sleeve member being axially limited by the two restricting grooves respectively so that the retaining housing and the sleeve member are fixed on the handle.

The handlebar grip of the present invention includes the holding face formed on the first segment of the sleeve member and at least one limiting projection to enhance softness and comfort when grasping the handlebar grip.

The retaining housings are fixed on the handle securely by using the locking device, and the sleeve member is retained on the handle tightly, preventing from disengagement.

The sleeve member and the retaining housings are capable of being replaced based on the rider's requirement.

The sleeve member and the retaining housing are made of different materials, for example, the sleeve member is made of the rubber material or the plastic material, and the engaging covers of the retaining housing is made of metal material or carbon fiber material, thereby enhancing aesthetics appearance.

The retaining housing is capable of being fixed on the outer end of the sleeve member and matching with the warning device or the plug member to obtain a warning effect and to close the outer end of the handle.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
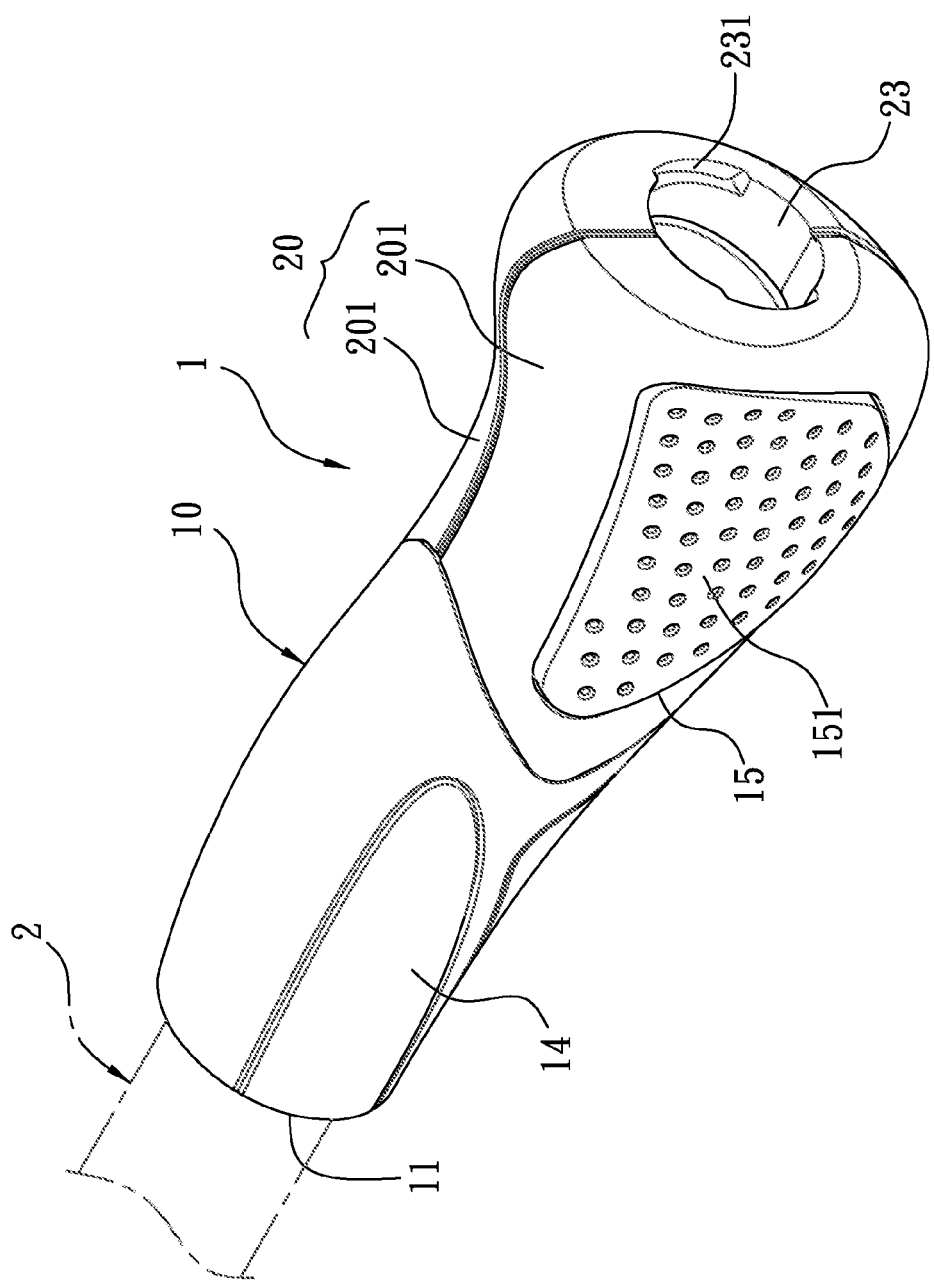
FIG. 1 is a perspective view showing the assembly of a handlebar grip for a bicycle or a motorcycle according to a first embodiment of the present invention.
Figure 2:
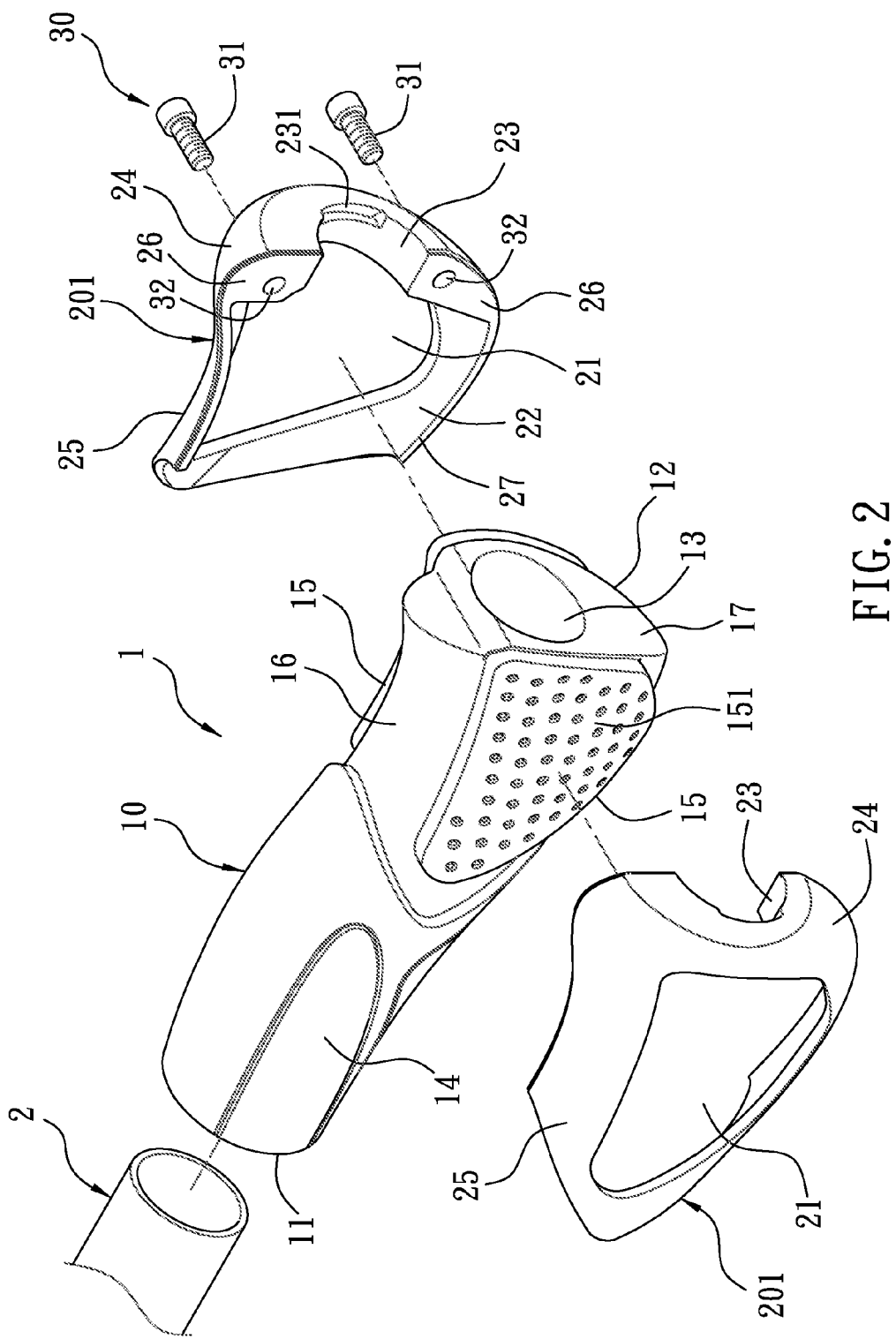
FIG. 2 is a perspective view showing the exploded components of the handlebar grip for the bicycle or the motorcycle according to the first embodiment of the present invention.

Referring to FIGS. 1 and 2, a handlebar grip 1 according to a first embodiment of the present invention is fixed on each of two handles 2 for a bicycle or a motorcycle to be held by a rider and comprises a soft sleeve member 10, a retaining housing 20, and a locking device 30.

The sleeve member 10 is integrally formed from a rubber material or a plastic material and includes a first segment 11, a second first segment 12, and a through hole 13 between the first segment 11 and the second segment 12 to insert the handle 2, a holding face 14 formed on the first segment 11 to be held the rider, two limiting projections 15 extending outward from a palm side and a distal side of a finger section of the second segment 12 respectively, and a recessed pressing zone 16 around each of the two limiting projections 15 of the second segment 12. The palm side of the second segment 12 of the sleeve member 10 is opposite to one side of a palm of a hand of the rider, and the distal side of the finger section of the second segment 12 of the sleeve member 10 is opposite to another side of a distal end of a finger of the rider while the rider holds the handle 2. The palm side and the distal side of the finger section of the sleeve member 10 are located at two opposite sides of an outer surface of the sleeve member 10 in a circumferential direction respectively.

Figure 3:
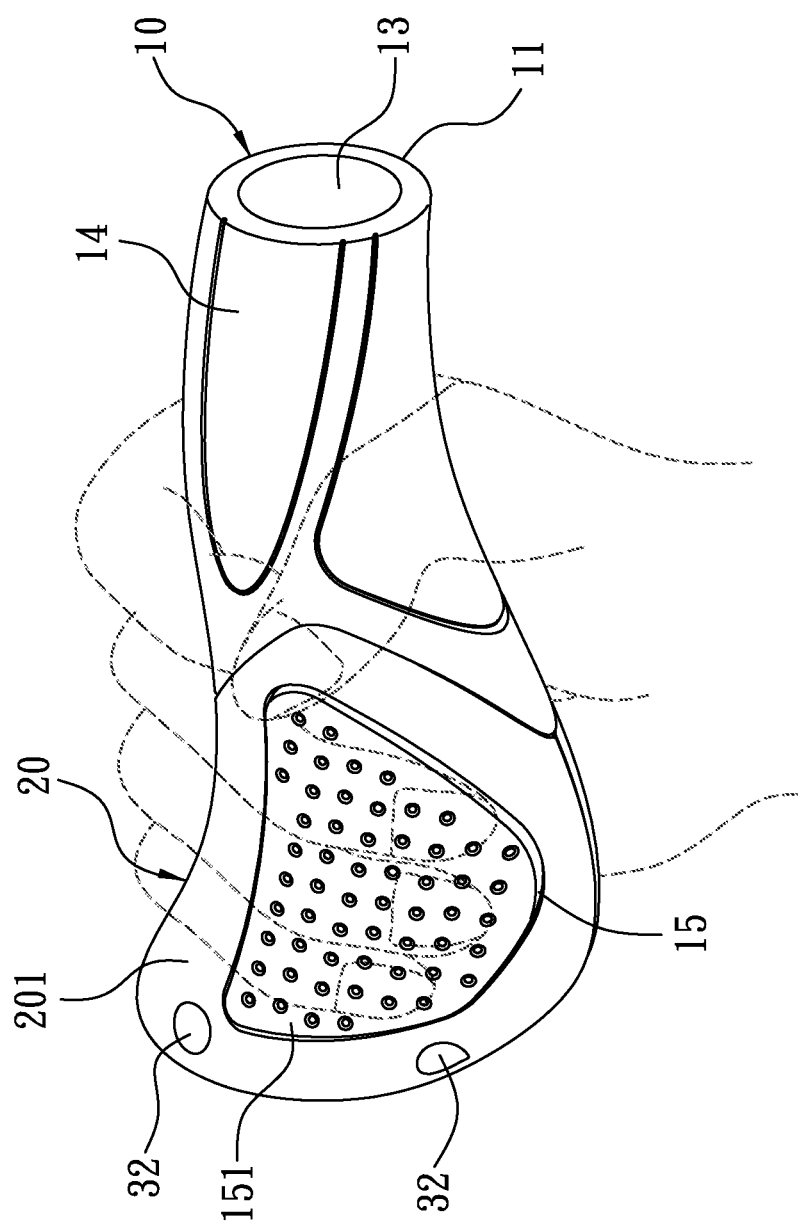
FIG. 3 is a perspective view showing the application of the handlebar grip for the bicycle or the motorcycle according to the first embodiment of the present invention.
Figure 4:
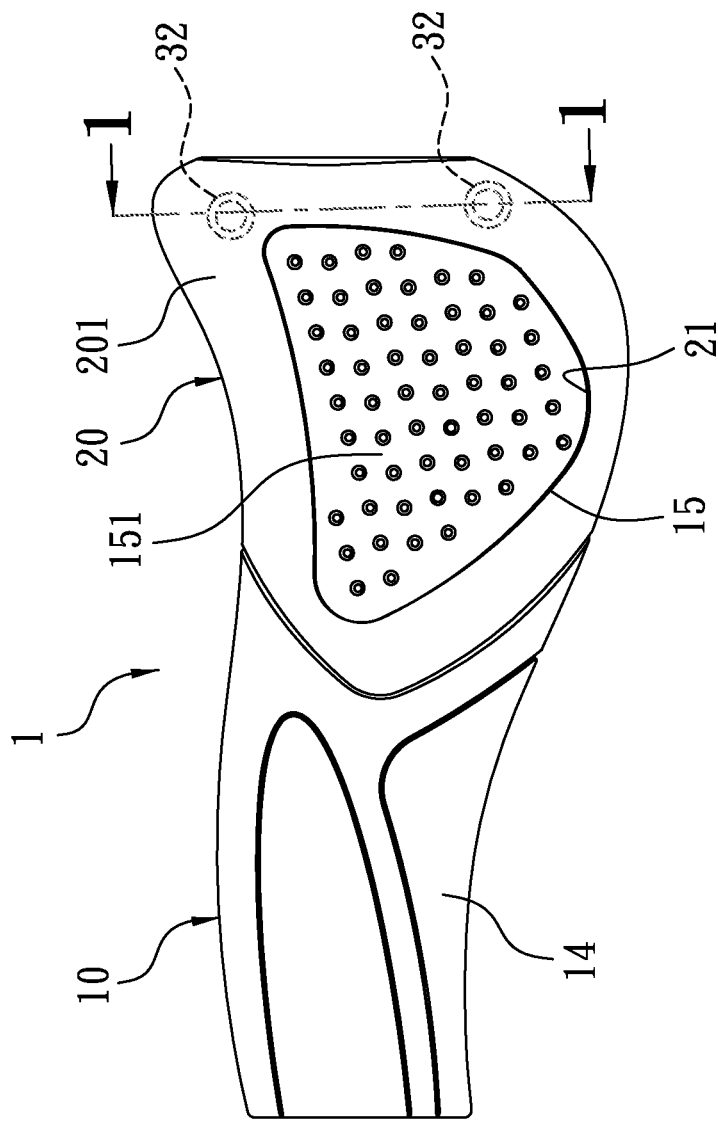
FIG. 4 is a cross sectional view showing the assembly of the handlebar grip for the bicycle or the motorcycle according to the first embodiment of the present invention.

The first segment 11 of the sleeve member 10 is opposite to an inner side of a part of the hand between a thumb finger and an index finger, and the second segment 12 of the sleeve member 10 is opposite to an outer side of the part of the hand between the thumb finger and the index finger, so the holding face 14 is located at an inner side of the sleeve member 10 to be held by the part of the hand between the thumb finger and the index finger as shown in FIG. 3.

The retaining housing 20 includes two restricting grooves 21 defined thereon to extend the two limiting projections 15 outward individually; a wall face 22 formed around each of the restricting grooves 21 and on an inner surface of each of the two engaging covers 201 to cover and abut against the pressing zone 16; the each of the two engaging covers 201 includes a C-shaped locking face 23 defined on an inner surface thereof to retain an outer surface of the handle 2 extending into the second segment 12 of the sleeve member 10.

Figure 6:
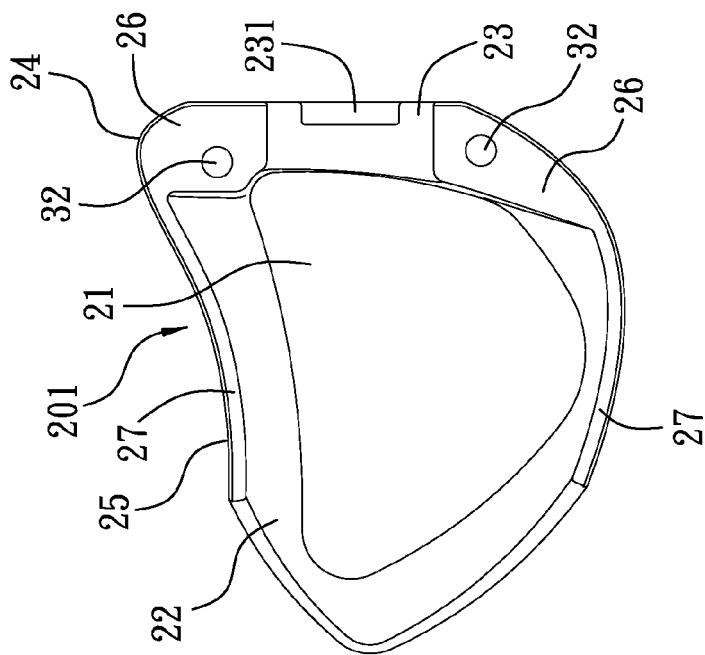
FIG. 6 is a plan view showing the assembly of an engaging cover of the handlebar grip for the bicycle or the motorcycle according to the first embodiment of the present invention.

Referring to FIGS. 2 and 6, the retaining housing 20 includes a C-shaped portion 24 defined on an outer surface thereof, a covering portion 25 integrally connected with the C-shaped portion 24; the C-shaped portion 24 includes the C-shaped locking face 23 formed on an inner surface thereof and two first connecting faces 26 located at two opposite sides of the C-shaped locking face 23 respectively; the covering portion 25 includes the wall face 22 formed on an inner surface thereof and two second connecting faces 27 formed on an peripheral side thereof integrally coupling with the two first connecting faces 26 of the C-shaped portion 24; the two engaging covers 201 are retained together by using the two first connecting faces 26 of the C-shaped portion 24 and the two second connecting faces 27 of the covering portion 25, thus forming the retaining housing 20.

When the two engaging covers 201 are retained together, a height of two outer surfaces of the two engaging covers 201 is equal to that of the holding face 14 of the sleeve member 10, forming a smooth and comfortable holding surface.

A top end of each of the two limiting projections 15 is higher that the two outer surfaces of the two engaging covers 201 so that when the rider grasps the retaining housing 20, his or her palm and distal ends of partial fingers touch two contacting faces 151 of the top ends of the two limiting projections 15 in advance individually. Moreover, the contacting face 151 of one limiting projection 15 located at the palm side of the second segment 12 is used to be grasped by the palm of the rider, and the contacting face 151 of another limiting projection 15 located at the distal side of the second segment 12 is grasped by a middle finger, a ring finger, and a little finger of the rider, enhancing softness and comfort when grasping the handlebar grip 1.

The sleeve member 10 includes an increasingly thicker portion 17 fixed on a wall surface thereof relative to the second segment 12 and adjacent to the rider as riding so that one part of the limiting projection 15 is formed, and the limiting projection 15 relative to the palm side is used to support the rider's palm. Furthermore, the pressing zone 16 is capable of being formed on the increasingly thicker portion 17 so that one of the two engaging covers 201 covered the pressing zone 16 is served to support the rider's palm, enhancing support strength.

The locking device 30 is applied to lock the two engaging covers 201 of the retaining housing 20 together so that the two engaging covers 201 are locked on the outer surface of the handle 2 outside the second segment 12 of the sleeve member 10 by using two C-shaped locking faces 23 respectively, and the recessed pressing zone 16 of the sleeve member 10 is retained by means of two wall faces 22 of the two restricting grooves 21 individually, the two limiting projections 15 of the sleeve member 10 are axially limited by the two restricting grooves 21 respectively. Thereby, the retaining housing 20 and the sleeve member 10 are fixed on the handle 2.

Figure 5:
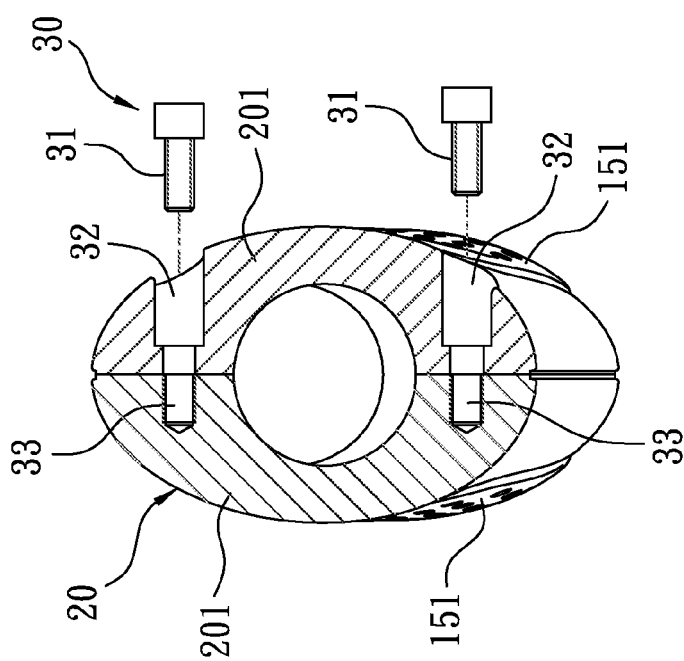
FIG. 5 is a cross sectional view taken along the lines 1-1 of FIG. 4.

The locking device 30 of the first embodiment includes:
two screwing elements 31 which are a screw bolt as shown in FIG. 5;
two orifices 32 defined on the two first connecting faces 26 of the C-shaped portion 24 individually;
two apertures 33 defined on the first connecting face 26 of the C-shaped portion 24 of another engaging cover 201 in a buried hole type; the two screwing elements 31 being screwed with the two apertures 33 through the two orifices 32 individually so that the two engaging covers 201 are screwed together.

The locking device 30 is not limited by above-mentioned screwing structure, any connecting structure to connect the two engaging covers 201 together is capable of being applied in this handlebar grip 1 of the present invention.

The locking device 30 is comprised of the two screwing elements 31, the two orifices 32, and the two apertures 33 to simplify structure and to lower related components so that the two C-shaped locking faces 23 of the two C-shaped portions 24 of the two engaging covers 201 retain the handle 2 securely, thus lowering component cost and obtaining aesthetics appearance. However, related components and quantity of the locking device 30 are not limited in this embodiment. All structure and techniques to connect the two engaging covers 201 are in the scope of the present invention.

In assembly of the handlebar grip 1 of this embodiment, the two engaging covers 201 are screwed on the sleeve member 10 by using the locking device 30, and then the retaining housing 20 and the locking device 30 of the sleeve member 10 are inserted and fixed on the handle 2 together, thereafter the screwing elements 31 of the locking device 30 are screwed tightly after adjusting an axial position of the retaining housing 20 and the locking device 3 on the handle 2, thereby finishing the assembly of the handlebar grip 1 easily and quickly.

Figure 7:
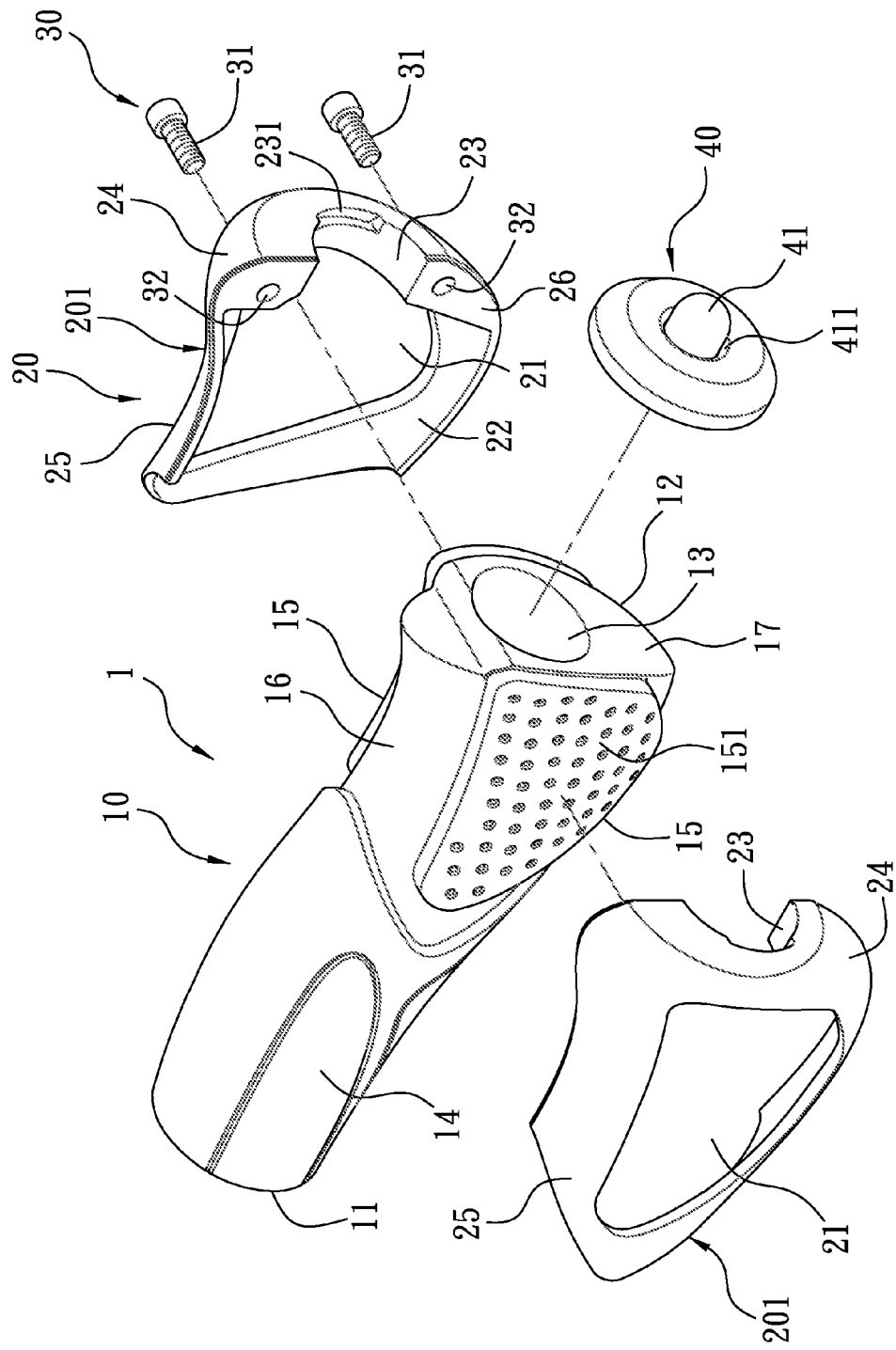
FIG. 7 is a perspective view showing the exploded components of a handlebar grip for a bicycle or a motorcycle according to a second embodiment a, of the present invention.

A difference of a handlebar grip 1 of a second embodiment from that of the first embodiment comprises a warning device 40 as illustrated in FIG. 7. The warning device 40 is fixed between the two C-shaped locking faces 23 to make warning light.

The warning device 40 includes:

a lid 41 being transparent or semi-transparent and having a bore 411 defined on a central position thereof;

a receiving case 42 screwed on an inner side of the lid 41 and received in an interior of an outer end of the handle 2 and having a returning spring 421 connected with a bottom end thereof;

a cell holder 43 received in the receiving case 42 and pushed outward by the returning spring 421;

a plurality of cells 44 being a lithium cell and received in the cell holder 43;

a touch button 45 disposed on an inner end of the cell holder 43 to be pressed;

a LED light 46 fixed on an outer end of the cell holder 43 and extended out of the bore 411 of the lid 41 so that when the rider presses the LED light 46, the cell holder 43 is actuated to move inward, and then the touch button 45 contacts with an inner surface of the receiving case 42 to turn on/off light or to switch light modes, and after the rider stops pressing the LED light 46, the returning spring 42 returns back to an original position automatically.

The warning device 40 includes two hook-shaped blocks 412 extending from the inner side of the lid 41, and the two C-shaped locking faces 23 include two slots 231 defined therein individually to retain with the two blocks 412, thus fixing the warning device 40 on the retaining housing 20

A difference of a handlebar grip 1 of a third embodiment from that of the first embodiment comprises:

the first segment 11 of the sleeve member 10 being an external end, and the second segment 12 being an internal end, so the retaining housing 20 is disposed on an inner end of the sleeve member 10, the two limiting projections 15 of the sleeve member 10 being located at the internal end of the sleeve member 10 so that the two contacting faces 151 of the two limiting projections 15 are grasped by the part of the rider's hand between the thumb finger and the index finger, the thumb, and the index finger. The holding face 14 is used to support the rider's palm and to be held by the middle finger, the ring finger, and the little finger.

Figure 12:
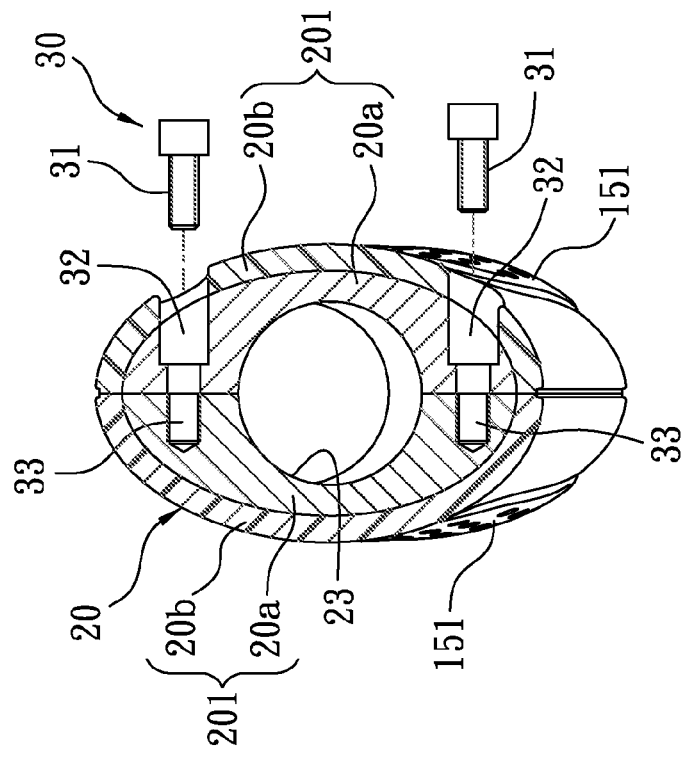
FIG. 12 is a cross sectional view taken along the lines 2-2 of FIG. 11.
Figure 8:
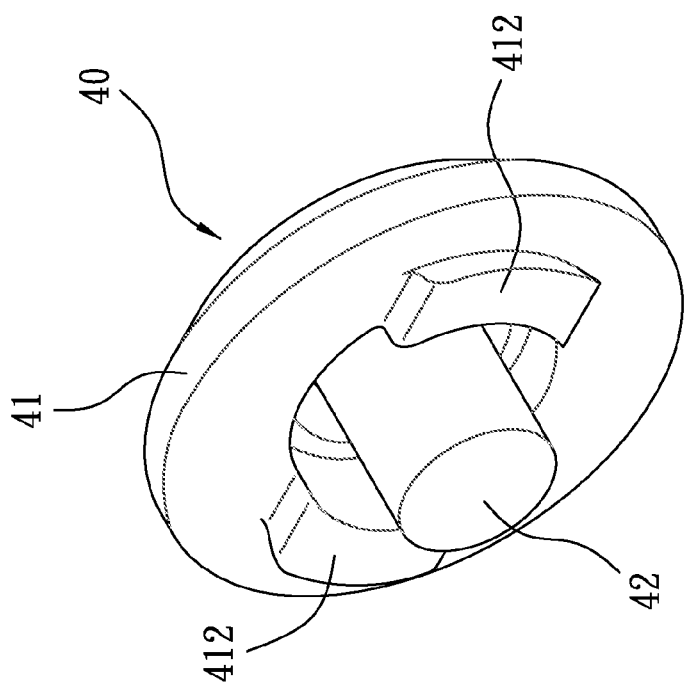
FIG. 8 is a perspective view showing the assembly of a warning device of the handlebar grip for the bicycle or the motorcycle according to the second embodiment of the present invention.
Figure 9:
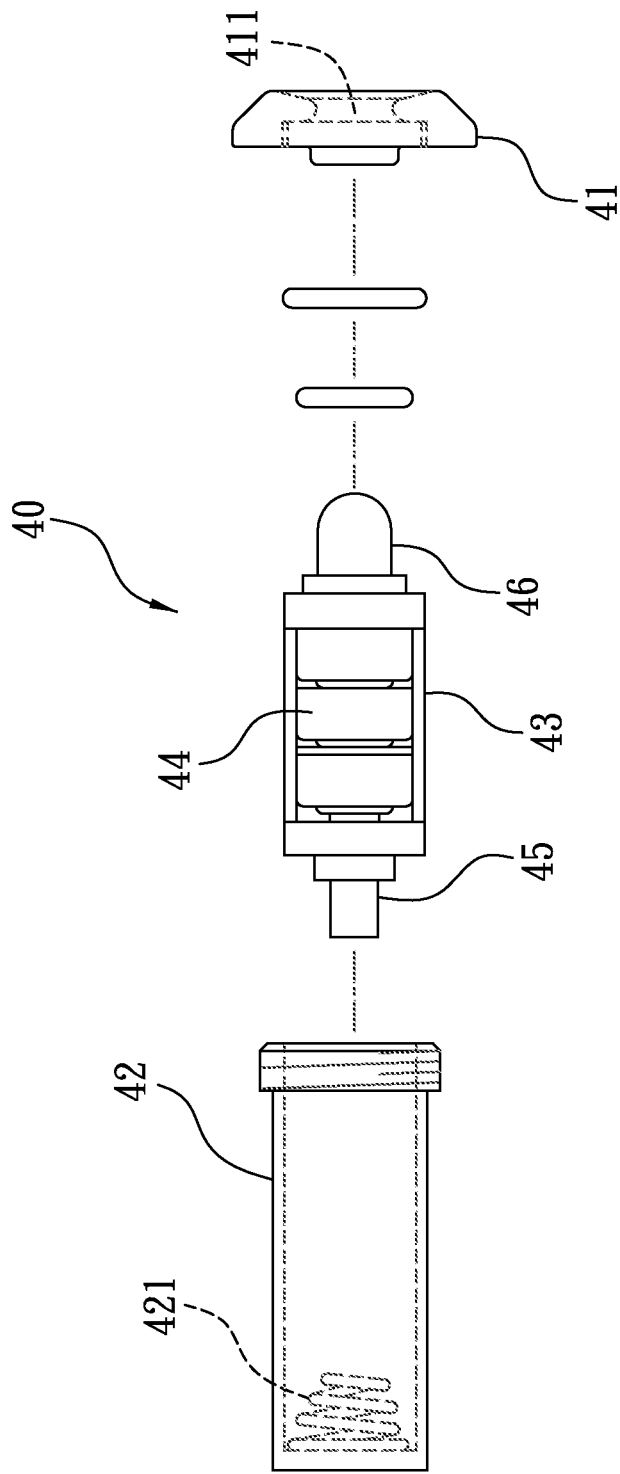
FIG. 9 is a plan view showing the assembly of the warning device of the handlebar grip for the bicycle or the motorcycle according to the second embodiment of the present invention.
Figure 10:
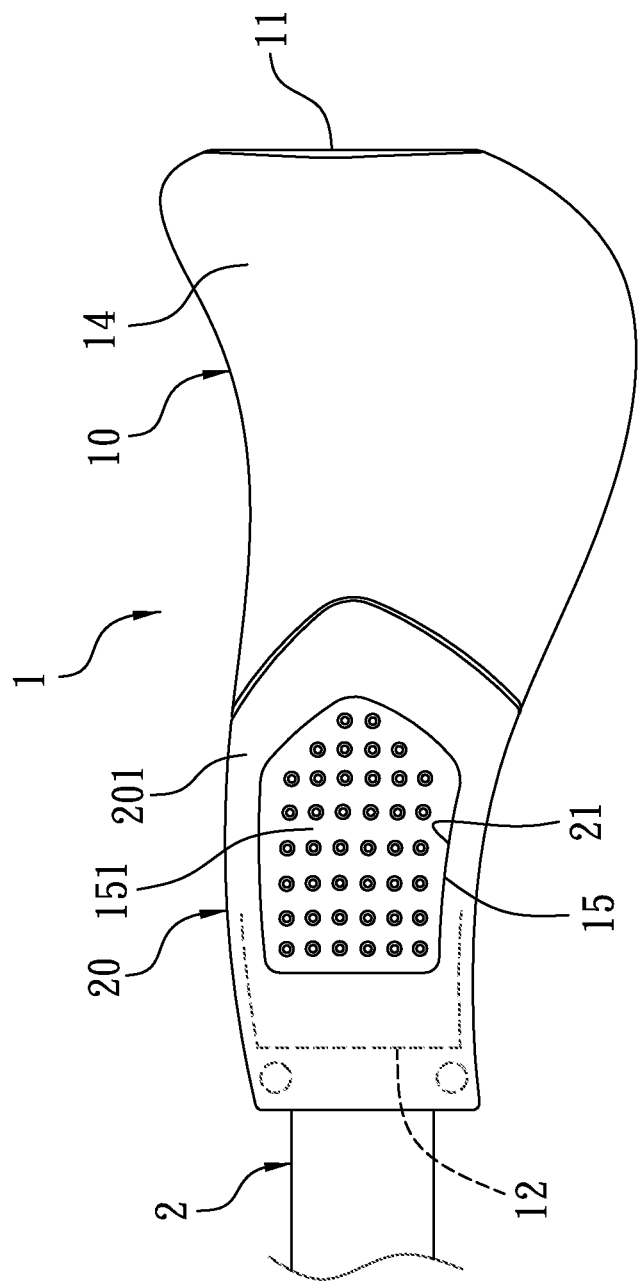
FIG. 10 is a plane view showing the assembly of a handlebar grip for a bicycle or a motorcycle according to a third embodiment of the present invention.
Figure 11:
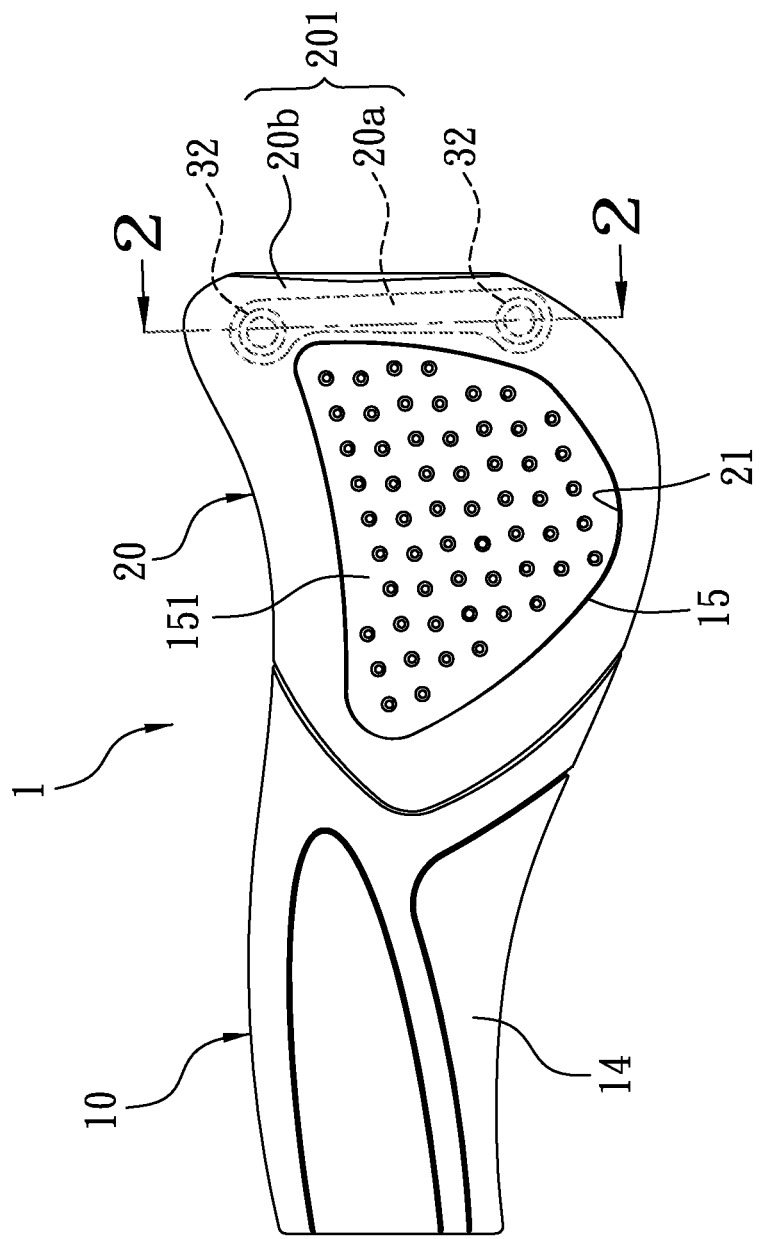
FIG. 11 is a plane view showing the assembly of a handlebar grip for a bicycle or a motorcycle according to a fourth embodiment of the present invention.

A difference of a handlebar grip 1 of a fourth embodiment from that of the first embodiment comprises:

two hard engaging covers 201, each including a metal member 20a and an extension 20b as illustrated in FIGS. 11 and 12.

Two metal members 20a of the two engaging covers 201 are a C-shaped loop, wherein one of the two metal members 20a includes the two apertures 33 defined therein, another metal-member 20a includes one part of each of the two orifices 32 defined therein.

The extension 20b is made of a hard plastic material and is injection molded around the metal member 20a to form a main part of the engaging cover 201, another part of the each of the two orifices 32 of the another metal member 20a connects with the one part of the each of the two orifices 32 to form two complete orifices 32. Thereby, a weight of the engaging cover 201 is lowered. Besides, a weight of the extension 20b made of carbon fiber is decreased as well.

The handlebar grip 1 is capable of matching with a plug member (not shown) to close the outer end of the handle 2. i.e., the two hook-shaped blocks 412 of the lid 41 are formed on the plug member to retain with the two slots 231 of the two C-shaped locking faces 23 respectively.

Figure 13:
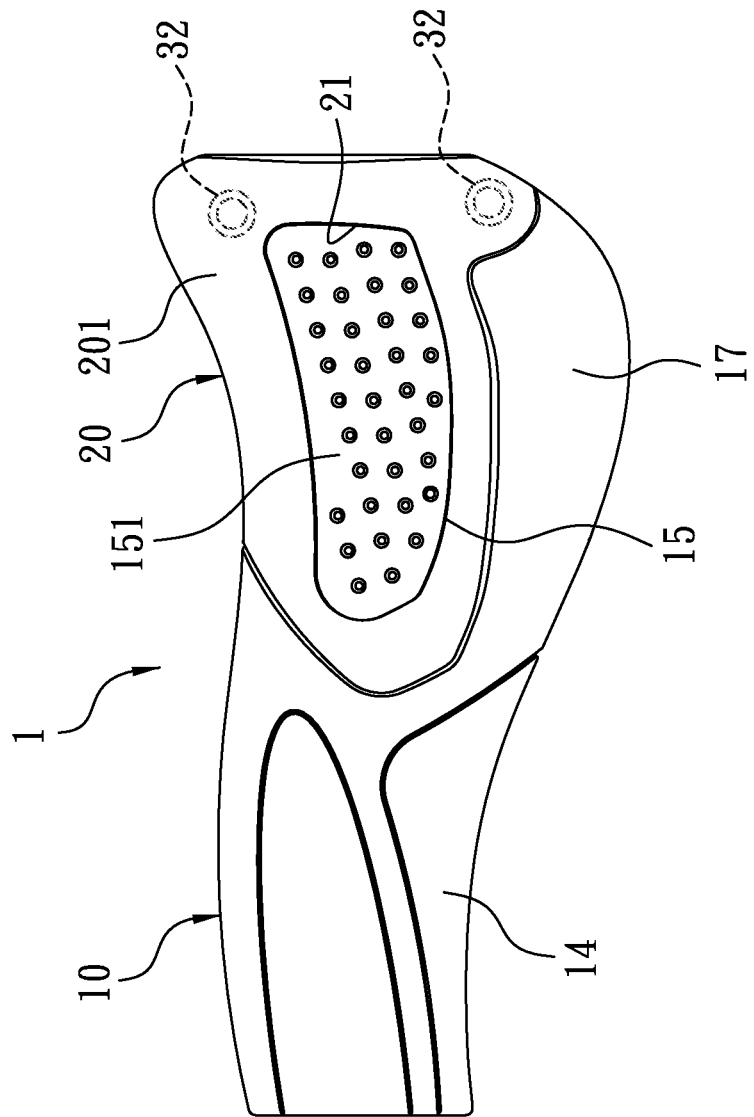
FIG. 13 is a plane view showing the assembly of a handlebar grip for a bicycle or a motorcycle according to a fifth embodiment of the present invention.

Referring to FIG. 13, a difference of a handlebar grip 1 of a fifth embodiment from that of the first embodiment comprises:

a size and a shape of the two limiting projections 15 and the two hard engaging covers 201, and two restricting grooves 21 being changed; and the two second connecting faces 27 being simplified.

Figure 14:
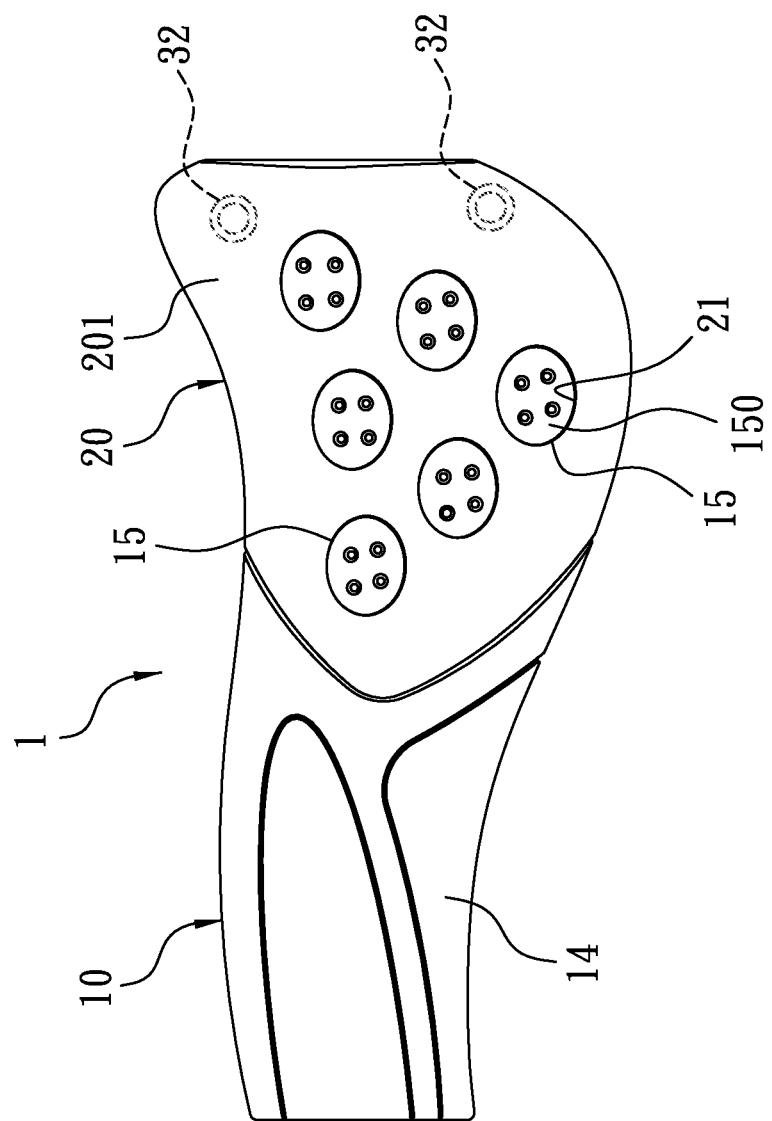
FIG. 14 is a plane view showing the assembly of a handlebar grip for a bicycle or a motorcycle according to a sixth embodiment of the present invention.

Referring to FIG. 14, a difference of a handlebar grip 1 of a sixth embodiment from that of the first embodiment comprises:

a quantity of and an area of the limiting projections 15 and the restricting grooves 21 being changed; but a plurality of limiting projections 15 located at the palm side of the second segment 12 or the distal side of the second segment 12 being formed in a smaller area, and each limiting projection 15 including a contacting face 151 formed on a top end thereof so that contacting faces 151 of the plurality of limiting projections 15 of this embodiment form the contacting face 151 of the limiting projection 15 of the first embodiment.

The handlebar grip 1 of the present invention includes the holding face 14 formed on the first segment 11 of the sleeve member 10 and at least one limiting projection 15 to enhance softness and comfort when grasping the handlebar grip 1.

The retaining housings 20 is fixed on the handle 2 securely by using the locking device 30, and the sleeve member 10 is retained on the handle 2 tightly, preventing from disengagement.

The sleeve member 10 and the retaining housings 20 are capable of being replaced based on the rider's requirement.

The sleeve member 10 and the retaining housing 20 are made of different materials, for example, the sleeve member 10 is made of the rubber material or the plastic material, and the engaging covers 201 of the retaining housing 20 is made of metal material or carbon fiber material, thereby enhancing aesthetics appearance.

The retaining housing 20 is capable of being fixed on the outer end of the sleeve member 10 and matching with the warning device 40 or the plug member to obtain a warning effect and to close the outer end of the handle 2.

While we have shown and described various embodiments in accordance with the present invention, it is clear to those skilled in the art that further embodiments may be made without departing from the scope of the present invention.

What is claimed is:

1. A handlebar grip for a bicycle or a motorcycle comprising:

a sleeve member including a first segment, a second first segment, and a through hole between the first segment and the second segment to insert a handle, a holding face formed on the first segment to be held a rider, at least one limiting projection extending outward from a palm side and a distal side of a finger section of the second segment respectively, and a recessed pressing zone around each of the at least one limiting projection;

a retaining housing including two hard engaging covers covered on the palm side and the distal side of the finger section of the second segment, at least one restricting groove to extend the at least one limiting projection outward; a wall face formed around each of the at leas one restricting groove and on an inner surface of each of the two engaging covers to cover and abut against the pressing zone; the each of the two engaging covers including a C-shaped locking face defined on an inner surface thereof to retain an outer surface of the handle extending into either of the first and the second segments of the sleeve member;

a locking device applied to lock the two engaging covers of the retaining housing together so that the two engaging covers are locked on the outer surface of the handle outside the second segment of the sleeve member by using two C-shaped locking faces respectively, and the two limiting projections of the sleeve member being axially limited by the two restricting grooves respectively so that the retaining housing and the sleeve member are fixed on the handle.

2. The handlebar grip for a bicycle or a motorcycle as claimed in claim 1, wherein the first segment of the sleeve member is opposite to an inner side of one part of a hand between a thumb finger and an index finger, and the second segment of the sleeve member is opposite to an outer side of another part of the hand between the thumb finger and the index finger.

3. The handlebar grip for a bicycle or a motorcycle as claimed in claim 2, wherein the sleeve member includes one limiting projection extending outward from the palm side thereof and another limiting projection extending from the distal side of the finger section thereof; the two hard engaging covers include two restricting grooves defined thereon to extend the two limiting projections outward individually.

4. The handlebar grip for a bicycle or a motorcycle as claimed in claim 2, wherein the sleeve member includes a plurality of limiting projections extending outward from the palm side thereof and the distal side of the finger section thereof; each of the two engaging covers includes a number of restricting grooves defined thereon.

5. The handlebar grip for a bicycle or a motorcycle as claimed in claim 2, wherein the sleeve member includes an increasingly thicker portion fixed on a wall surface thereof relative to the second segment and adjacent to the rider as riding.

6. The handlebar grip for a bicycle or a motorcycle as claimed in claim 5, wherein the increasingly thicker portion of the sleeve member includes one part of the limiting projection and one part of the pressing zone so that the one part of the limiting projection and one, of the two engaging covers covered the pressing zone are served to support the rider's palm.

7. The handlebar grip for a bicycle or a motorcycle as claimed in claim 1, wherein the sleeve member is integrally formed from either of a rubber material or a plastic material.

8. The handlebar grip for a bicycle or a motorcycle as claimed in claim 1, wherein the each of the two engaging covers is integrally made of a metal material.

9. The handlebar grip a for a bicycle or a motorcycle s claimed in claim 1, wherein the locking device includes
at least two screwing elements;
at least two orifices defined on the one of the two engaging covers;
at least two apertures defined on another of the two engaging covers relative the at least two orifices; the at least two screwing elements being screwed with the at least two apertures through the at least two orifices individually so that the two engaging covers are screwed together.

10. The handlebar grip for a bicycle or a motorcycle as claimed in claim 9, wherein the locking device is comprised of two screwing elements, the two orifices, and the two apertures; the retaining housing includes a C-shaped portion defined on an outer surface thereof, and a covering portion integrally connected with the C-shaped portion; the C-shaped portion includes the C-shaped locking face formed on an inner surface thereof and two first connecting faces located at two opposite sides of the C-shaped locking face respectively; the two orifices being defined on the two first connecting faces of the C-shaped portion individually; the two apertures being defined on the first connecting face of the C-shaped portion of another engaging cover; the covering portion includes the wall face formed on an inner surface thereof and two second connecting faces formed on an peripheral side thereof integrally coupling with the two first connecting faces of the C-shaped portion; the two engaging covers are retained together by using the two first connecting faces of the C-shaped portion and the two second connecting faces of the covering portion.

11. The handlebar grip for a bicycle or a motorcycle as claimed in claim 9, wherein each of the two hard engaging covers includes a metal member and an extension made of a hard plastic material and injection molded around the metal member, wherein one of two metal members of the two hard engaging covers includes the two apertures of the locking device defined therein, another part of the each of the two orifices of the another metal member connects with the one part of the each of the two orifices to form two complete orifices, the extension is used to form a main part of the engaging cover.

12. The handlebar grip for a bicycle or a motorcycle as claimed in claim further comprising a warning device fixed between the two C-shaped locking faces to make warning light.

13. The handlebar grip for a bicycle or a motorcycle as claimed in claim 12, wherein the warning device includes:
a lid being transparent or semi-transparent and having a bore defined on a central position thereof;
a receiving case screwed on an inner side of the lid and received in an interior of an outer end of the handle and having a returning spring connected with a bottom end thereof;
a cell holder received in the receiving case and pushed outward by the returning spring;
a plurality of cells received in the cell holder;
a touch button disposed on an inner end of the cell holder to be pressed;
a LED light fixed on an outer end of the cell holder and extended out of the bore of the lid so that when the rider presses the LED light, the cell holder is actuated to move inward, and the touch button contacts with an inner surface of the receiving case to turn on/off light or to switch light modes, and after the rider stops pressing the LED light, the returning spring returns back to an original position automatically.

14. The handlebar grip for a bicycle or a motorcycle as claimed in claim 13, wherein the two C-shaped locking faces include two slots defined therein individually; the warning device includes two hook-shaped blocks extending from the inner side of the lid to retain with the two slots individually when the two C-shaped locking faces of the retaining housings 20 retain the handle.

15. The handlebar grip for a bicycle or a motorcycle as claimed in claim further comprising a plug member retained by the two C-shaped locking faces to close the outer end of the handle.

16. The handlebar grip for a bicycle or a motorcycle as claimed in claim 1, wherein the first segment of the sleeve member is an external end opposite to the part of the rider's hand between the thumb finger and the index finger, and the second segment of the sleeve member is an internal end relative to the part of the rider's hand between the thumb finger and the index finger.

17. The handlebar grip for a bicycle or a motorcycle as claimed in claim 16, wherein two limiting projections extending outward from a palm side and a distal side of a finger section of the sleeve member respectively; the two engaging covers have two restricting grooves defined thereon individually.

18. The handlebar grip for a bicycle or a motorcycle as claimed in claim 16, wherein a plurality of limiting projections are located at the palm side and the distal side of the finger section of the sleeve member; a number of restricting grooves are defined on each of the two engaging covers.

19. The handlebar grip for a bicycle or a motorcycle as claimed in claim 1, wherein when the two engaging covers are retained together, a height of two outer surfaces of the two engaging covers is equal to that of the holding face of the sleeve member; a top end of each of the two limiting projections is higher that the two outer surfaces of the two engaging covers so that when the rider grasps two contacting faces of the top ends of the two limiting projections individually.

* * * * *